UNITED STATES PATENT OFFICE.

MAYNARD J. TROTT, OF COLORADO SPRINGS, COLORADO, ASSIGNOR TO THE DORR CYANIDE MACHINERY COMPANY, OF DENVER, COLORADO.

METHOD OF CLEANING SCREENS, FILTERING FABRICS, AND THE LIKE.

1,052,191. Specification of Letters Patent. Patented Feb. 4, 1913.

No Drawing. Application filed August 4, 1911. Serial No. 642,389.

*To all whom it may concern:*

Be it known that I, MAYNARD J. TROTT, a citizen of the United States of America, residing at Colorado Springs, in the county of El Paso and State of Colorado, have invented certain new and useful Improvements in Methods of Cleaning Screens, Filtering Fabrics, and the Like, of which the following is a specification.

My invention relates to a novel method of cleaning screens, filtering fabrics and other similar objects after they have lost all or part of their permeability by the adhesion or precipitation of solids contained in matter passed through their meshes.

My process is particularly adapted for use in cleaning screens of the class employed in sifting comminuted ores and in removing the extraneous matter which adheres to the sides of the permeable leaves through which the valuable solution is forced or drawn in the filtration treatment of gold and silver ore-slimes by cyanid of potassium and other solvents. In an apparatus of the character last mentioned, the most effective method used heretofore for removing the adherent matter such as calcium carbonate and calcium sulfate from the cloth sides of the filter leaves, has consisted in washing the latter with dilute hydro-chloric acid (HCl), a process which involves much labor, considerable expense and many other objectionable features, chief among which are the imperfect cleaning of the inner surfaces of the cloth sides, the destructive action of the acid on the fabric necessitating frequent renewal, the reduction in the efficiency of the acid-wash after repeated treatments, the fact that the acid does not remove deposited calcium sulfate and the difficulty encountered in places remote from supply houses, in obtaining the large quantities of acid required in the process.

By my improved method of cleaning the filter-leaves, all the above enumerated objectionable features are effectively obviated, the cloths are thoroughly cleaned in the minimum of time not only of the entire coatings deposited at both the inside and outside surfaces of the cloth sides of the leaves, but also of all matter which has lodged or precipitated in the interstices of the fabric.

My process is effectively practised without necessitating the removal of the cloth from the leaf-frames, it does in no way injure the fabric but successfully restores it to its original condition, without impairment of its filtering and wearing qualities.

Advantages similar to those derived from the practice of my process in cleaning filtering fabrics, are obtained in cleaning the screens made of woven wire or other material, used in stamp-mills, Chilian mills and other apparatus employed in the treatment of comminuted ores, as it will effectively remove the adherent matter from both sides of the screens without their being removed from their frames or from their position in the mill with which they are connected, a feature which is of particular advantage as in most mills of this class, one side of the screens is inaccessible for cleaning purposes.

My improved method of cleaning the screens or filtering fabrics consists in subjecting the surface thereof to the combined concussive and abrasive actions of a mass of hard-granular material, such as sand, comminuted quartz and the like which is violently projected against said surface either by mechanical means of by the use of air under compression, steam or other motive fluid.

In the cleaning of filter-leaves only the outer surfaces of the cloth sides thereof are subjected to the action of the abradant and by the judicious selection of a material of suitable hardness and size and by properly regulating the force with which it is projected against the leaves, only the heavy exterior coating of the latter is entirely penetrated, but little of the material is forced through the cloth, and the lighter matter adhering to the inner surfaces of the sides of the leaves as well as that lodged in the interstices thereof, is removed principally by the concussive action of the projected material upon the cloth.

As the abradant is projected against the surfaces to be cleaned with a force insufficient to penetrate the fabric or other material of which they are composed, the deteriorative effects of the cleaning process are reduced to the minimum, all adherent matter is speedily and thoroughly removed from both the inner and outer surfaces of the screens or fabrics and the latter may thus be used repeatedly to effectively perform their functions without necessitating the frequent renewals and repairs at present required in the operation of the apparatus in which the screens and leaves are employed.

To obtain the most satisfactory results in the practice of my process in cleaning filter leaves, the latter should be thoroughly dried before being subjected to the action of the abradant, for the purpose of rendering the coatings of slime and lime brittle and thereby expediting the removal thereof.

It should be clearly understood that the statements contained in the foregoing description of my process are not merely theoretical or speculative, but are based upon carefully conducted experiments and practical demonstrations continuously carried on during a considerable period of time with screens and filtering fabrics of apparatus in actual use.

Having thus described my improved method of cleaning screens, filtering fabrics and the like and having pointed out the advantages derived in the practice thereof, what I claim and desire to secure by Letters-Patent is:—

1. The method of removing adherent matter from filtering leaves consisting in first drying the leaves to render the coatings adhering to the permeable sides thereof, brittle, and then subjecting the latter to the concussive action of an abradant violently projected against the exterior surfaces thereof.

2. The method of removing adherent matter from screens, filtering fabrics and the like, consisting in subjecting them to the action of a granular solid abradant violently projected against the surface thereof.

In testimony whereof I have affixed my signature in presence of two witnesses.

MAYNARD J. TROTT.

Witnesses:
A. L. BLOMFIELD,
C. W. ANKENY.